(12) United States Patent
Bergami et al.

(10) Patent No.: US 10,682,790 B2
(45) Date of Patent: Jun. 16, 2020

(54) COMPRESSION MOLD

(71) Applicant: SACMI Cooperativa Meccanici Imola Societa' Cooperativa, Imola (IT)

(72) Inventors: Stefano Bergami, Castel San Pietro Terme (IT); Davide Penazzi, Imola (IT)

(73) Assignee: SACMI COOPERATIVA MECCANICI IMOLA SOCIETA' COOERATIVA (IT)

( * ) Notice: Subject to any disclaimer, the term of this patent is extended or adjusted under 35 U.S.C. 154(b) by 179 days.

(21) Appl. No.: 15/541,586

(22) PCT Filed: Jan. 20, 2016

(86) PCT No.: PCT/IB2016/050263
§ 371 (c)(1),
(2) Date: Jul. 5, 2017

(87) PCT Pub. No.: WO2016/120751
PCT Pub. Date: Aug. 4, 2016

(65) Prior Publication Data
US 2018/0001521 A1    Jan. 4, 2018

(30) Foreign Application Priority Data
Jan. 30, 2015  (IT) .............................. MO2015A0016

(51) Int. Cl.
*B29C 43/54*     (2006.01)
*B29C 43/08*     (2006.01)
(Continued)

(52) U.S. Cl.
CPC .............. *B29C 43/54* (2013.01); *B29C 43/08* (2013.01); *B29C 43/36* (2013.01); *B29C 43/361* (2013.01); *B29C 43/58* (2013.01); *B29C 2037/94* (2013.01); *B29C 2043/585* (2013.01); *B29L 2031/565* (2013.01)

(58) Field of Classification Search
CPC ....... B29C 43/54; B29C 43/361; B29C 43/36; B29C 43/08; B29C 2043/585; B29C 2037/94; B29C 43/58; B29L 2031/565
See application file for complete search history.

(56) References Cited

U.S. PATENT DOCUMENTS

| | | | |
|---|---|---|---|
| 5,786,079 A * | 7/1998 | Alieri ...................... | B29C 33/24 425/349 |
| 6,585,508 B1 | 7/2003 | Zuffa | |

(Continued)

FOREIGN PATENT DOCUMENTS

EP        0162456 A2     11/1985

*Primary Examiner* — Michael M. Robinson
(74) *Attorney, Agent, or Firm* — Laubscher & Laubscher, P.C.

(57) ABSTRACT

A mold is provided for forming caps for closing containers by compression molding doses of plastic material, where a bottom wall of the cap, or at least one portion of the bottom wall is very thin. The mold includes two half-molds axially movable towards each other which assume an end closed position without a dose. A tubular element is slidable around the second half-mold and partially defines the cavity. The tubular element contacts an axial abutment of the first half-mold at one side and an axial end stop of the second half-mold at the other side to prevent hard contact between the half-molds.

9 Claims, 17 Drawing Sheets

(51) Int. Cl.
*B29C 43/36* (2006.01)
*B29L 31/56* (2006.01)
*B29C 37/00* (2006.01)
*B29C 43/58* (2006.01)

(56) References Cited

U.S. PATENT DOCUMENTS

| | | |
|---|---|---|
| 6,736,628 B1 | 5/2004 | Zuffa |
| 2004/0166119 A1 | 8/2004 | Parrinello et al. |
| 2004/0166193 A1* | 8/2004 | Parrinello ............... B29C 43/08 425/418 |
| 2007/0098833 A1 | 5/2007 | Mattice |

* cited by examiner

COMPRESSION MOLD

CROSS-REFERENCE TO EARLIER APPLICATION

This application is a § 371 National Stage Entry of PCT/IB2016/050263 filed Jan. 20, 2016 entitled "Compression Mold." PCT/IB2016/050263 claims priority to IT-MO2015A000016 filed Jan. 30, 2015. The entire content of these applications are herein incorporated by reference in their entirety.

BACKGROUND OF THE INVENTION

The invention concerns a mold, particularly a mold for press forming doses of plastic material being separated from an extruder.

Specifically, but not exclusively, the invention can be applied to form plastic caps, for example to close containers.

The prior art includes the mold of FIGS. 1 and 2 which are suitable for compression molding plastic material doses. This mold of a known type includes a first half-mold 1 (lower matrix) and a second half-mold 2 (upper punch) being axially movable towards one each other in order to assume at least one open position (not shown) and at least one non-end closed position (FIG. 1). A tubular element 3 being axially slidable is arranged around the second half-mold 2. In the non-end closed position (closed and filled mold, namely filled with at least one dose), the lower end of the tubular element 3 contacts an axial abutment 4 arranged on the first half-mold 1, the bottom of the forming cavity has a thickness equal to D, and the axially movable actuator element 5 which bears the first half-mold 1 is placed at an axial distance equal to E from an abutment of end stop 6 being arranged on the press body 7. In an end closed position (FIG. 2, closed and empty mold, namely without a dose), the above-mentioned axially movable actuator element 5 has contacted the abutment of end stop 6 and the bottom thickness of the forming cavity has been reduced to a value T2 equal to D–E. The bottom of the forming cavity is defined above by the lower surface of the second half-mold 2, which is placed at a fixed distance equal to C3 from the abutment of end stop 6. It should be noted that the precision of the value T2 of the thickness dimension of the bottom of the forming cavity, without a plastic material dose, also depends on the precision of the above-mentioned distance C3.

One of the drawbacks of the known mold described above can be seen when the bottom thickness D of the object to be formed is very thin.

In this case, the nominal thickness T2 of the forming cavity in the end closed position (closed and empty mold) could be significantly reduced, for example being of the same order of magnitude of the dimensional tolerances (particularly being bound to the different elastic and/or thermal deformations of the different molds which are usually carried by the press and to the elastic and/or thermal deformation itself of the press complex structure). This results in a hard contact risk, or in an excessive distance between the "wet" surfaces of the two reciprocally facing half-molds when the empty mold closes, without plastics, where with wet surfaces it is intended for the forming cavity surfaces to contact the plastics during the forming phase.

This hard contact can result in a collision between the two half-molds during the closure phase, causing considerable damage to the mold.

The risk is increased when the press is formed by a complex apparatus, such as for example a forming carousel which rotates a plurality of molds, because in this case the precision of the distance T2 with an empty mold would inevitably be very poor as it would depend on a long chain of dimensional tolerances going through the forming carousel. The deviation of the real dimension from the nominal dimension T2, generally different from mold to mold, could be excessive for at least one or more molds, leading to the hard contact.

Practically, in the compression molding carousel for doses of plastic material of a known type, it is not possible to mold objects (caps) having a bottom with nominal thickness lower than about 0.2-0.3 millimeters.

U.S. Pat. No. 6,736,628 shows in FIG. 1-3 a compression mold which includes a tubular element 57 being axially movable upwards against a spring 74. The compression mold shown by U.S. Pat. No. 6,736,628, when closed empty and without plastics, will have to assume a closing position different from the closing position with plastics.

Generally, in compression molding, it is the reciprocal movement of the mold parts that transmits the deformation force to the plastic dose to be deformed; this deformation force must be transmitted during all the molding phase, also following the shrinking of the material itself during the molding final phase. For this reason the actuator element 5 shown in FIG. 1 will not have to be in abutment (E>0). In the compression molding according to the known art shown in FIG. 2, the closing position without plastics is defined by the abutment 6 and thus the gap T2 is affected by a quite "long" kinematic chain.

Therefore, the compression mold shown by U.S. Pat. No. 6,736,628 could show the risk of hard contact between the two half-molds during the closure phase without plastics, especially when the bottom thickness of the object to be formed is very thin. All this is not dependent on the dimensional tolerances, whose effect adds to the one just mentioned, and to which deformations caused by thermal components can be added.

As it will be shown below, the solution, which is the object of the present invention, firstly allows reducing the tolerance chain, which affects the definition of the closed mold geometry in a known compression mold, and secondly allows making this tolerance chain substantially independent from the press deformation.

In accordance with embodiments of the present invention, as it can be seen for example in FIG. 4, the condition of a closed mold without plastics is determined, particularly, by the closure of the first half-mold 1 on the tubular element 3 (abutment 4) and through this on the end stop 8: the gap T1 is determined by the only dimensional tolerances of the elements shown as 1, 2, 3, and the actuator is not abutting (A2>0). Therefore, the condition of a closed mold with plastics (FIG. 3) causes forces to be transmitted to the plastic (non-abutting actuator, A1>0) with the element 3 in mold closure on the first half-mold 1 (see abutment 4), but not abutting against the second half-mold 2 (B>0).

Moreover, U.S. Pat. No. 6,736,628 shows in FIG. 4 an injection mold which does not have the spring 74 and, since it is not a compression mold, it is outside the context of the present application. It should be noted that, in an injection mold, the plastic is injected after the mold closure. In the injection molding system, the plastic in the fluid state is injected inside the forming cavity when it is already "closed", while in a compression mold—as the one according to embodiments of the present application—two closed configurations exist, one without plastic and the other with plastic. In the injection mold shown in FIG. 4 of U.S. Pat. No. 6,736,628, the mold is closed without plastic and the collar 60 must necessarily contact the cup-shaped element 82. It cannot be different, since the plastic must be injected in the forming cavity. In the mold of FIG. 4, a closed position without plastic where the forming cavity volume is less than the closed position with plastic would be unacceptable, because in this closed position with plastic—being purely hypothetical and totally unsuitable—the collar 60 and the element 82 will inevitably lose contact from each other, with the devastating effect of the injected plastic coming out from the forming cavity, which therefore will not be able to be considered as effectively closed. This hypothetical detachment between the collar 60 and the element 82, in the version of FIG. 4 of U.S. Pat. No. 6,736,628, will be even more unacceptable because, as it is known, in order to facilitate the escape of air, ventings are often made whose dimensions are such to let the air pass through, but not the melted plastic and the minimal increment of these ventings will be enough to cause the plastic escape due to the detachment of the above-mentioned parts 60 and 82. In embodiments of the present compression mold, as it will be better explained in the following detailed description, the abutment 4 always contacts the half-mold 1 (see FIGS. 3 and 4 of the present application), preventing the plastic escape, both without plastic and with plastic. This happens also in instances where ventings are provided.

Moreover it should be noticed that in case the thickness of one wall (for example the bottom) of the object to be formed is very thin, the flow sections for the fluid plastic are very narrow, making it extremely difficult for the plastic to flow. Consequently, as a practical matter, injection molding is totally unsuitable to form very thin walls, unless extremely fluid plastics are used, resulting in a limitation of the application field.

U.S. Pat. No. 5,786,079 discloses an apparatus for manufacturing screw closures by pressure molding. US 2007/098833 discloses a machine for compression molding closure shells.

SUMMARY OF THE INVENTION

In accordance with embodiments of the present application a compression mold solves one or more of the above-mentioned drawbacks of the known art.

Where the wet surfaces are surfaces of the forming cavity intended to contact the plastic during the forming phase, in accordance with embodiments of the present application, hard contact between the wet surfaces of the two half-molds also without plastics is avoided.

As mentioned above, in accordance with embodiments of the present invention, hard contact by the elastic and/or thermal deformation of the press structure on which the mold is assembled is avoided. Particularly, the above-mentioned hard contact is avoided regardless of the elasticity of the press structure.

In accordance with embodiments of the present invention, any deformation (thermal and/or elastic) of the press body, or of other elements external to the mold, will not affect the precision of the dimension defining the thickness of the object wall, particularly because that precision will be dependent on a tolerance chain that is internal to each single mold.

In accordance with embodiments of the present invention a mold particularly suited for the compression molding of caps for closing containers is provided.

In accordance with embodiments of the present invention a mold particularly suited for the compression molding of objects having at least one very thin wall portion, particularly caps having at least one very thin portion of a bottom wall is provided.

In accordance with embodiments of the present invention the dimensional tolerance chain, defining the distance precision between two facing mold surfaces without plastics, develops only along dimensions of mold elements, without affecting dimensions of apparatus (press) elements on which the mold itself is assembled.

In accordance with embodiments of the present invention the compression assembly is able to obtain the desired thickness of the bottom wall of the molded object even when the mold is supplied with a plastic dose having an insufficient or abundant volume.

Even after the relatively thin bottom wall of the object in the forming cavity is already solidified, in accordance with embodiments of the present application, transmission of the compression forces compensates for the shrinkage of the plastic material.

An object of the invention is to realize a plastic element having at least one weak portion, which can be opened by fracture, for example a fracture caused by a pull, tear, push force, etcetera.

In accordance with embodiments of the present application an element, for example a cap to close containers is provided. The element includes at least one wall with one or more facilitated fracture weak areas, each including a continuous material membrane.

In accordance with embodiments of the present invention, one or more facilitated fracture weak areas is provided, each being made of a continuous material membrane.

In accordance with embodiments of the present invention, weak areas that do not have discontinuities in the material flow lines are formed.

In accordance with embodiments of the present invention, the mechanical characteristics of the material in the weak areas are uniform and insensitive to thermal and/or aging phenomena.

In accordance with embodiments of the present invention, the development of plastic material splinters during breaking phase of the weak portion is avoided.

In one example, a mold to compression form plastic material doses, particularly to form elements having at least one facilitated fracture thin wall, includes two half-molds (die and punch), which are axially movable towards each other, and a tubular element, which is axially slidable around one of the two half-molds, the mold assuming an end closed position, without a dose, wherein the tubular element is arranged contacting an axial abutment of one half-mold at one side and an axial end stop of the other half-mold at the other side, in order to prevent hard contact between the half-molds.

In one example, a plastic element includes a body made by compression molding plastic material in a single piece, wherein the body includes at least one facilitated fracture portion formed by a continuous membrane.

BRIEF DESCRIPTION OF THE DRAWINGS

The invention will be better understood and carried out referring to the attached drawings, which illustrate some non-limiting carrying out examples thereof.

DETAILED DESCRIPTION

In this description, similar elements in common with different mold examples illustrated in the FIGS. 1 to 12 have been shown with the same numbers and similar elements in common with different examples of cap bodies illustrated in FIGS. 13 to 30 have been shown with the same numbers.

Figure 1:
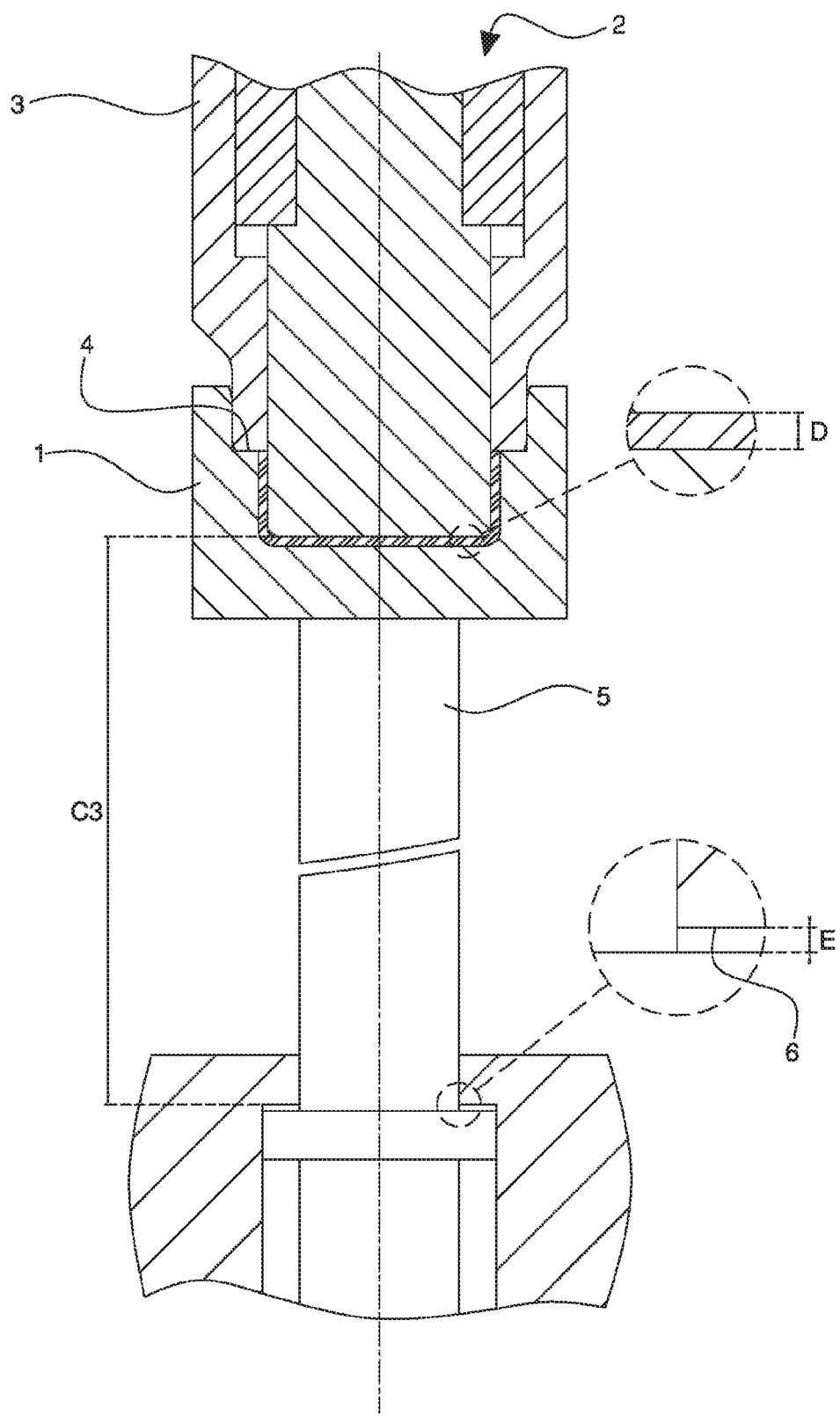
FIG. 1 is a vertical elevation cross-section of a mold of a known type in a closed configuration with a plastic dose.
Figure 2:
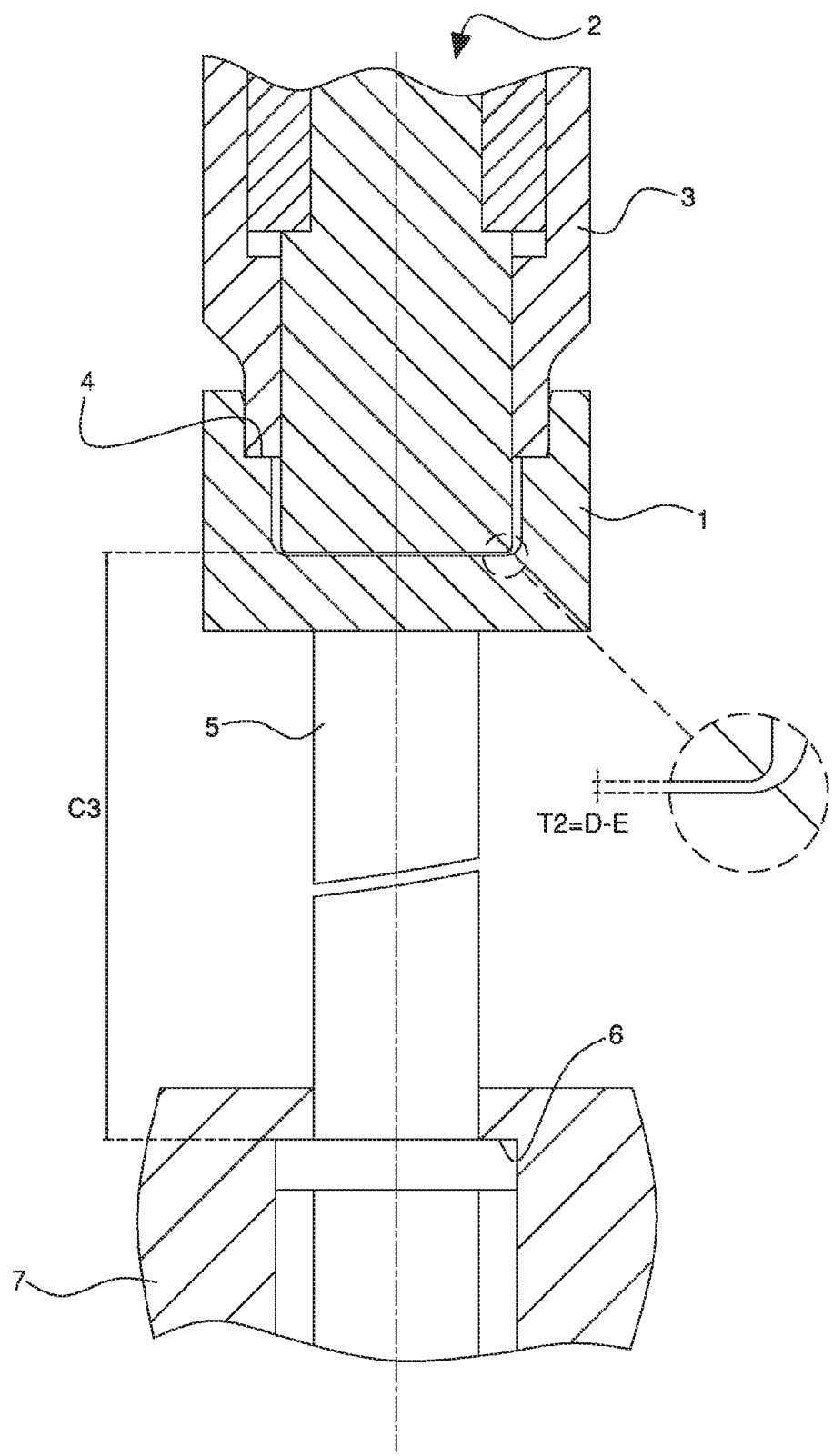
FIG. 2 shows the mold of a known type of FIG. 1 in a closed configuration without a plastic dose.
Figure 3:
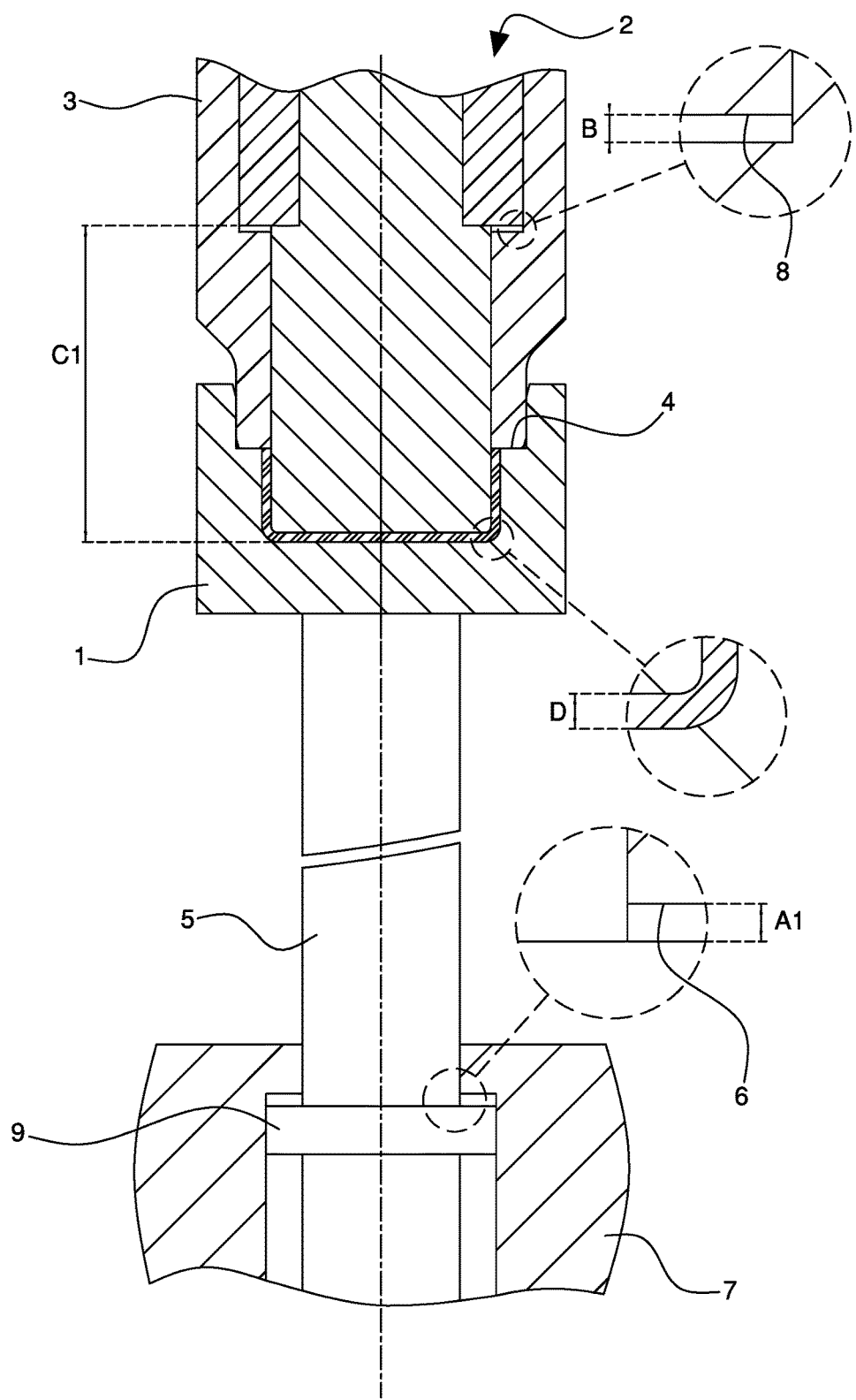
FIG. 3 is a vertical elevation cross-section of a first example of a mold according to an embodiment of the invention in a closed configuration with a plastic dose.
Figure 4:
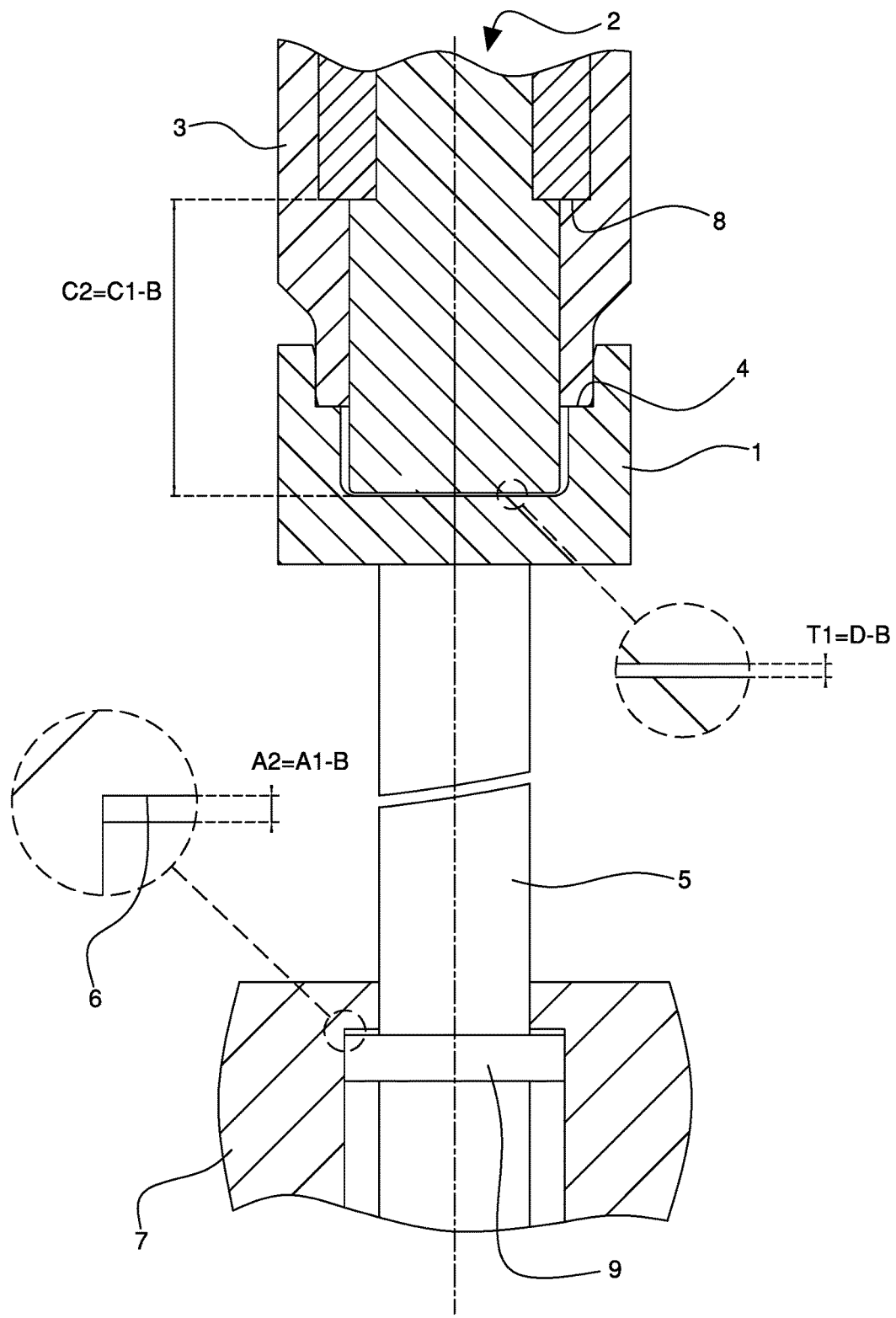
FIG. 4 shows the mold of FIG. 3 in a closed configuration without a plastic dose.

Referring to the FIGS. 3 and 4, a mold example for compression molding doses of plastic material according to an embodiment of the invention is illustrated. The mold includes a first (lower) half-mold 1 and a second (upper) half-mold 2 being axially movable (with vertical X axis) towards each other in order to assume an open position (not shown) in which it is possible to insert at least one dose of plastic material (coming from an extruder) between the above-mentioned half-molds and a non-end closed position (FIG. 3) or closed position with a dose, in which the dose of plastic material (in the pasty state) can be pressed in a cavity at least partially defined by the above-mentioned half-molds.

The first half-mold 1 has a first surface perpendicular to the axis and facing upwards which defines the bottom of the forming cavity on one side (below). The second half-mold 2 has a second surface perpendicular to the axis and facing downwards which defines the bottom of the forming cavity on the opposite side (above). The first and second surfaces are flat, parallel and axially facing each other.

The first half-mold 1 may include, for example, a die. The second half-mold 2 may include, for example, a punch.

In the specific case, the axial opening and closing movement of the mold is provided to the first half-mold 1 by an actuator element 5, for example the movable element of a linear actuator having a vertical axis. The linear actuator may be arranged on a forming apparatus, for example on a body of a press 7, to which the mold is operationally associated.

The mold includes a tubular element 3 which is axially movable. The movable tubular element 3 may be arranged around the second half-mold 2. Particularly, the movable tubular element 3 may be axially slidable with respect to the first half-mold 1 and/or with respect to the second half-mold 2. The movable tubular element 3 may be slidingly coupled with an external surface of the second half-mold 2. The movable tubular element 3 may be supported by the second half-mold 2.

With the closed mold, when the first and the second half-mold 1 and 2 are in the non-end closed position shown in FIG. 3, the tubular element 3 may partially define the forming cavity. When the first and second half-mold 1 and 2 are in the non-end closed position, the tubular element 3 may be arranged contacting an axial abutment 4 located on the first half-mold 1. During the mold closure phase with reciprocal approaching of the half-molds 1 and 2, for example the movable first half-mold 1 rising towards the fixed second half-mold 2 which bears the tubular element 3, the axial abutment 4 facing upwards of the first half-mold 1 will meet and contact the first lower, downwards facing end of the tubular element 3.

The mold may assume an end closed position without a dose as shown in FIG. 4, wherein the cavity volume defined between the half-molds 1 and 2 is lower than the above-mentioned non-end closed position.

In the end closed position without a dose the tubular element 3 may contact the above-mentioned axial abutment 4 from one side and an axial downward facing end stop 8 located on the second half-mold 2 on the opposite side.

The end closed position without a dose may be defined, particularly, by the positions of the abutment 4 and end stop 8. When the first half-mold 1 and the second half-mold 2 are in the end closed position of FIG. 4, the cavity may be defined by the two above-mentioned first and second flat surfaces, one of the first half-mold 1 and the other of the second half-mold 2, which axially face each other and spaced at a minimum distance T1 from each other.

This minimum distance T1 may be, for example, less than 0.4 millimeters or less than 0.3 millimeters or less than 0.2 millimeters, particularly between 0.005 and 0.3 millimeters or between 0.01 and 0.2 millimeters or between 0.02 and 0.1 millimeters.

In the non-end closed position of FIG. 3, the tubular element 3 may beat an axial distance equal to B from the above-mentioned axial end stop 8. In the non-end closed position, the two first and second wet surfaces facing each other may be at a reciprocal minimum axial distance equal to D. This distance D substantially corresponds to the thickness of the bottom wall of the object in the forming cavity. In the non-end closed position, the bottom of the cavity, that is the first horizontal surface of the first half-mold 1, may be at an axial distance equal to C1 from the above-mentioned axial end stop 8 arranged on the second half-mold 1 In the non-end closed position, the axially movable actuator element 5 which carries the first half-mold 1 may be placed at a distance equal to A1 from an abutment of end stop 6 arranged on the press body 7.

In the end closed position of FIG. 4, the upper end of the tubular element 3 contacts the above-mentioned axial end stop 8. In the end closed position, the two first and second surfaces facing each other may be at a reciprocal minimum axial distance equal to T1=D−B. This distance T1 substantially corresponds to the thickness of the cavity in the extreme situation of minimum volume of the empty cavity, namely without plastic material. In the end closed position, the bottom of the cavity, that is the first surface of the first half-mold 1 which defines the mold cavity at the bottom, may be at an axial distance equal to C2=C1−B from the above-mentioned axial end stop 8 being arranged on the second half-mold 2. In the end closed position, the axially movable actuator element 5 which carries the first half-mold 1 may be placed at an axial distance equal to A2=A1−B from the above-mentioned abutment of end stop 6 arranged on the press.

In order to form objects having a very thin bottom wall (for example having a nominal thickness of about 2 hundredths of millimeter), a high precision of the distance T1 will have to be ensured, that is the distance between the two first and second surfaces of the two half-molds 1 and 2 axially facing each other, that is the two wet surfaces perpendicular to the X axis of the mold which define the thickness of the object bottom wall during the forming phase.

In the specific case, the distance T1 depends on dimensional tolerances of elements all belonging to the mold and not on elements of the press body 7 or on elements external to the mold. Particularly, the distance T1 will depend on the precision being used to obtain the first half-mold 1, particularly the axial distance between the first surface and the axial abutment 4 contacting the lower first end of the tubular element 3, the second half-mold 2, particularly the axial distance between the second surface and the axial end stop 8 contacting the upper second end of the tubular element 3 and the movable tubular element 3 particularly the axial distance between the lower first end and the upper second end. Therefore, the distance T1 will be a function of a tolerance chain being internal to each individual mold. Practically, any thermal and/or elastic deformation of the press body 7 or of other elements external to the mold, will not affect the dimension T1 precision.

As set forth above, one of the two half-molds, for example the first half-mold 1, may be carried by a movable actuator element 5 of a vertical axis linear actuator. This movable actuator element 5 may have a protruding portion 9 which may be distant at the distance A2 from the above-mentioned actuator axial abutment of end stop 6, when the first half-mold 1 and the second half-mold 2 are in the end closed position without a dose.

When the first half-mold 1 and the second half-mold 2 are in the end closed position, the tubular element 3 may partially define the mold cavity. When the first half-mold 1 and the second half-mold 2 are in the non-end closed position, the tubular element 3 may partially define the mold cavity.

The mold non-end closed position may be assumed, with at least one dose of plastic material inside the mold cavity. The mold end closed position may be assumed, without the plastic material inside the mold cavity.

Figure 5:
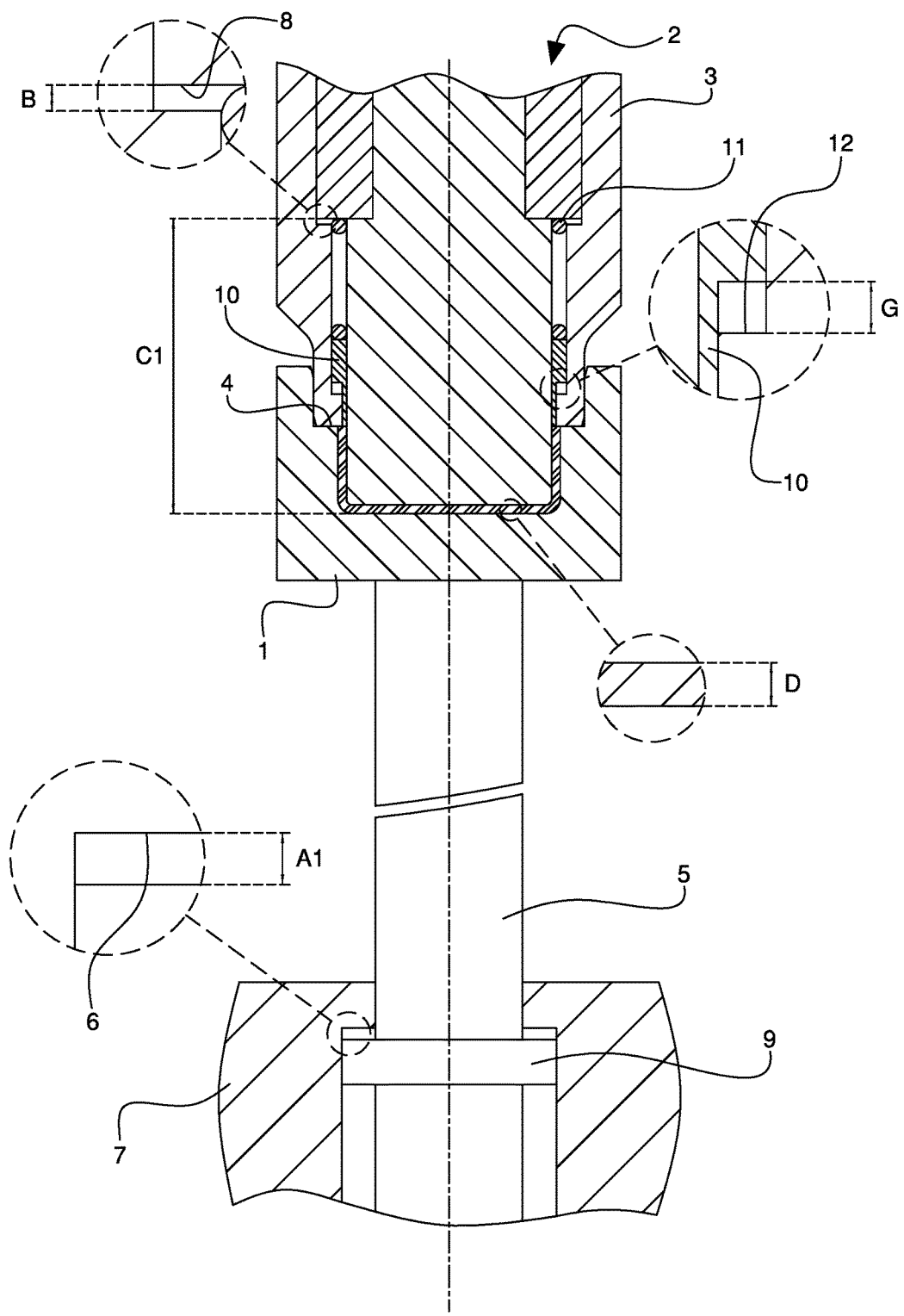
FIG. 5 is a vertical elevation cross-section of a second example of a mold according to an embodiment of the invention in a closed configuration with a plastic dose.
Figure 6:
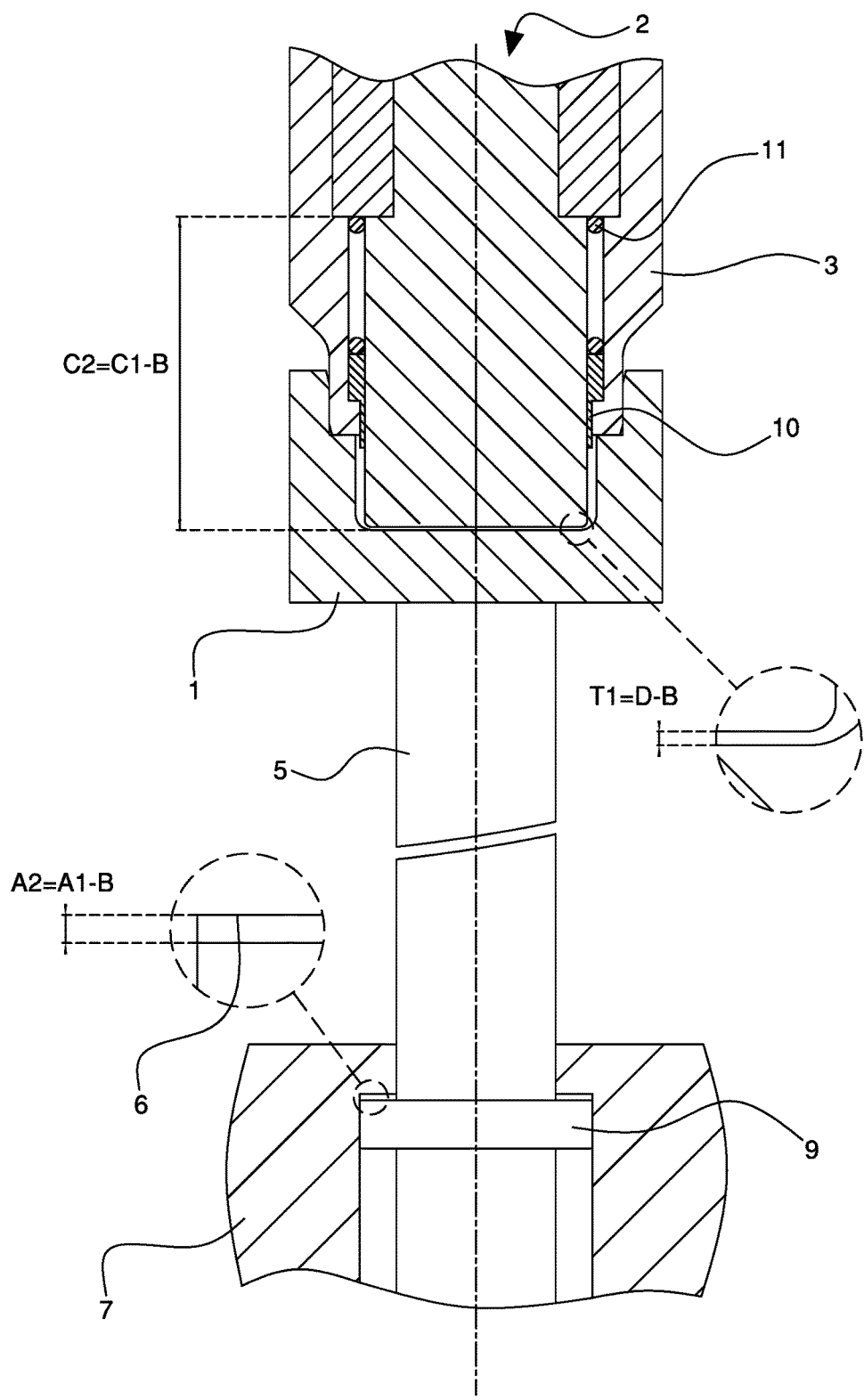
FIG. 6 shows the mold of FIG. 5 in a closed configuration without a plastic dose.

Referring to FIGS. 5 and 6, the mold may include a compensation assembly partially defining the cavity when the first half-mold 1 and the second half-mold 2 are in the end closed position without a dose, as shown in FIG. 6 and in the non-end closed position with a dose as shown in FIG. 5. In particular, the compensation assembly may include at least one element axially movable to vary the cavity volume. In the specific case, the compensation assembly includes a tubular body 10 slidingly coupled with the tubular element 3 and/or with the second half-mold 2. The compensation assembly may be between the tubular element 3 and the second half-mold 2. The compensation assembly may include an elastic element 11 arranged in order to push the tubular body 10 against an abutment 12 arranged on the tubular element 3. The elastic element 11 may be arranged between the second half-mold 2 and the axially movable tubular element 3. In the non-end closed position, the action of the plastic material pressing in the cavity against the elastic element 11 will cause the tubular body 10 to be placed at an axial distance G from the abutment 12 as shown in FIG. 5.

The compensation assembly allows for the formation of a molded object having a bottom wall having a specific volume when the mold is supplied with a plastic dose of insufficient volume.

When the bottom wall of the object in the forming cavity is already solidified (which can occur quickly since it is relatively thin) the compensation assembly compensates for the shrinking of the plastic material ensuring the transmission of the compression forces.

The compensation assembly may define an annular area of the forming cavity away from the bottom of the cavity, particularly a cavity area where an end annular area of a lateral tubular portion of the object such as a cap to be molded is formed. Therefore, due to the compensation assembly mobility, the cavity area has a variable geometry.

During the forming phase, the pasty plastic material which is in the cavity area, exerts a pushing action against the compensation assembly opposing the action of the elastic means 11 due to the compression force between the two half-molds 1 and 2. The compensation action avoids the development of defects in the formed object, particularly in the above-mentioned cavity area where they operate.

Referring to the embodiment illustrated in FIGS. 7 to 12, at least one of the two reciprocally facing first and second surfaces may have one or more areas 13 shaped and arranged to form reduced thickness wall portions and other areas 14 adjacent to the above-mentioned areas 13 shaped and arranged to form wall portions having greater thickness. These reduced thickness wall portions may be placed at the above-mentioned minimum distance T1. These thinner portions having a reduced thickness adjacent to the thicker wall bottom portions of the product form one or more facilitated fracture weak areas or portions. Fracture occurs as a result of traction and/or torsion and/or compression, particularly fracture by tearing, piercing, pushing, etc., of a bottom wall of the finished product. The weak portions may define opening areas.

Figure 9:
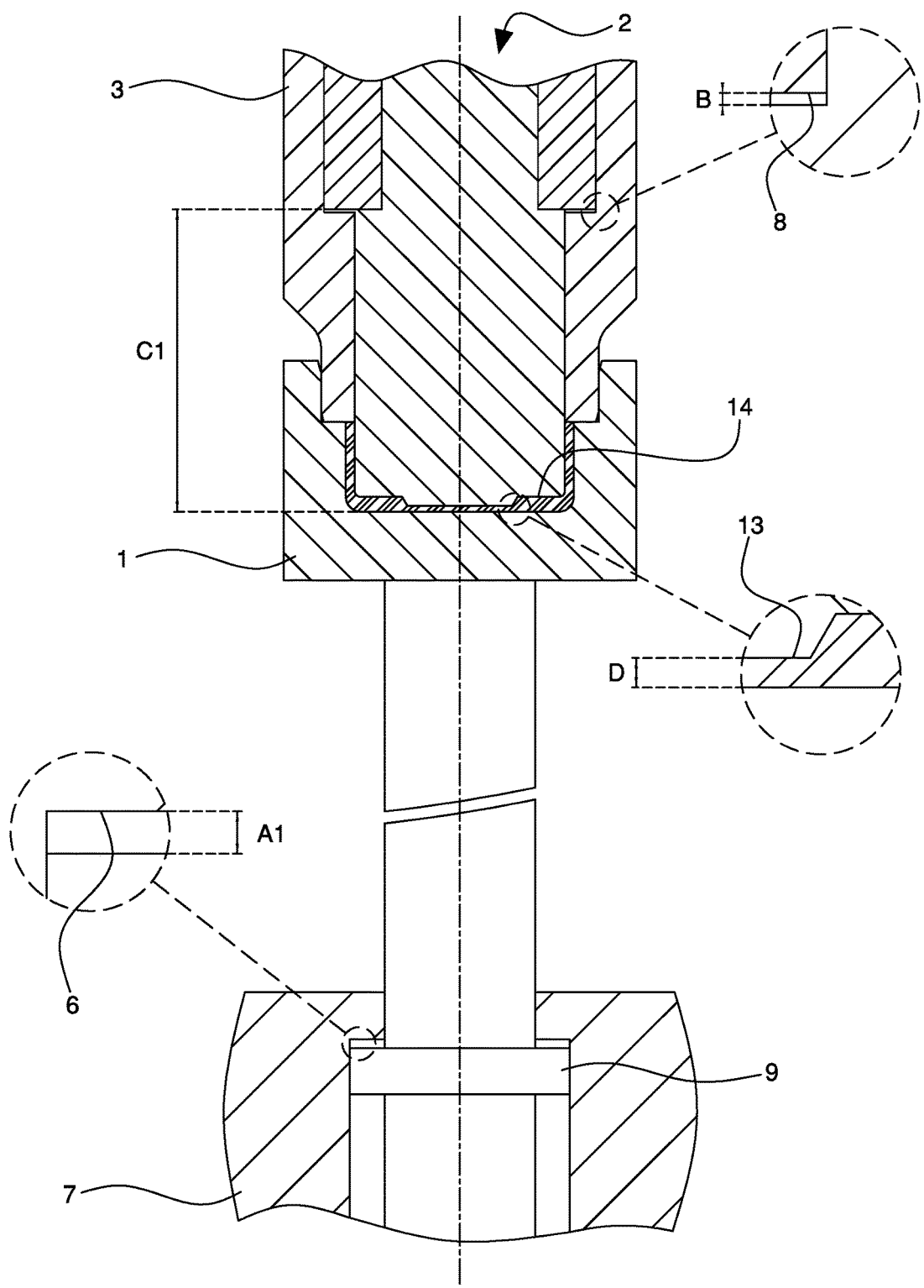
FIG. 9 is a vertical elevation cross-section of a fourth example of a mold according to an embodiment of the invention in a closed configuration with a plastic dose.
Figure 10:
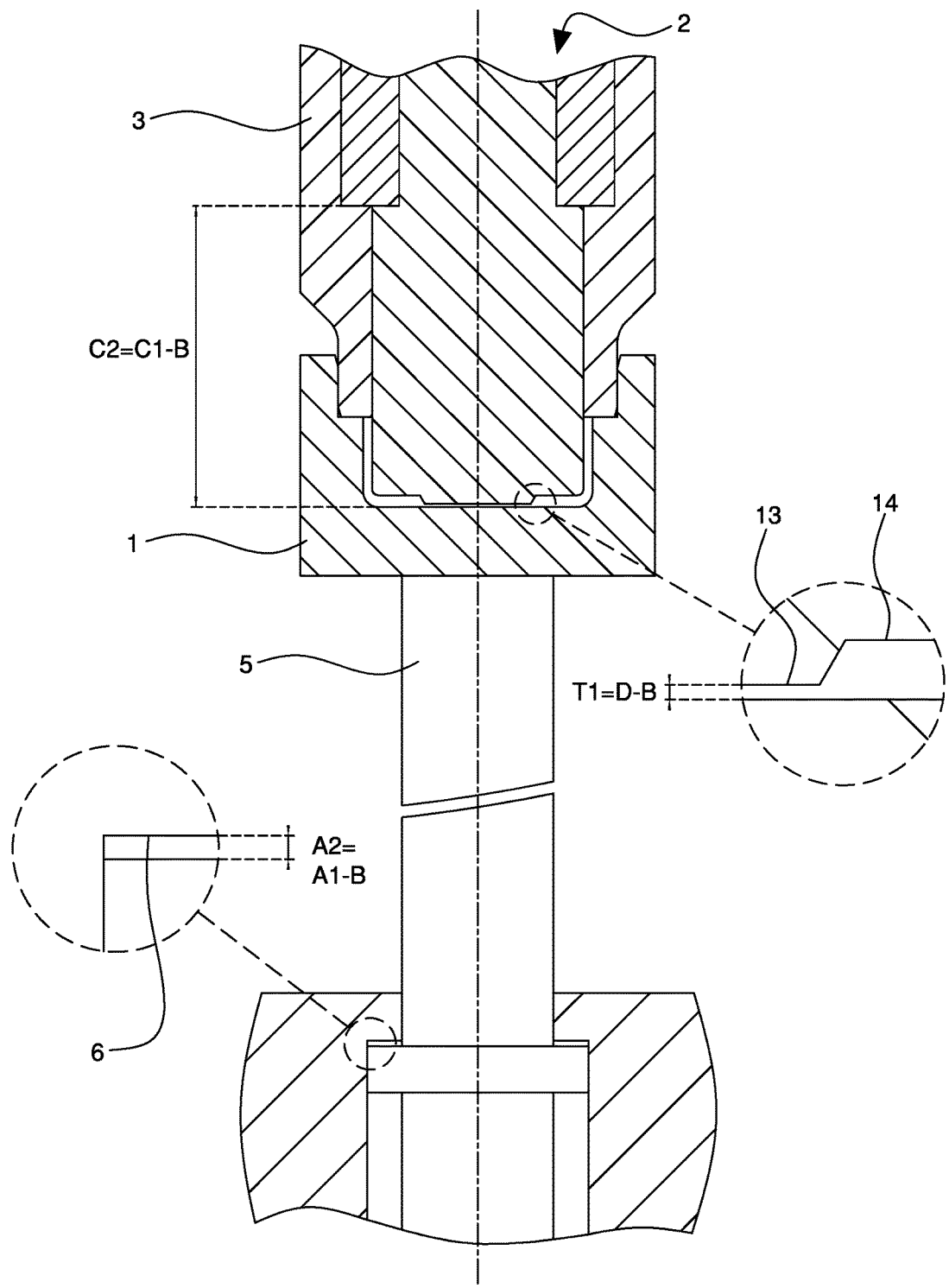
FIG. 10 shows the mold of FIG. 9 in a closed configuration without a plastic dose.

In particular, the area 13 may be disc-shaped as in the embodiment of FIGS. 9 and 10. The area 13 may be useful to form a lowered central portion of the bottom wall of the object. This central disc-shaped portion may be easily pierced since its thickness is much reduced.

Figure 7:
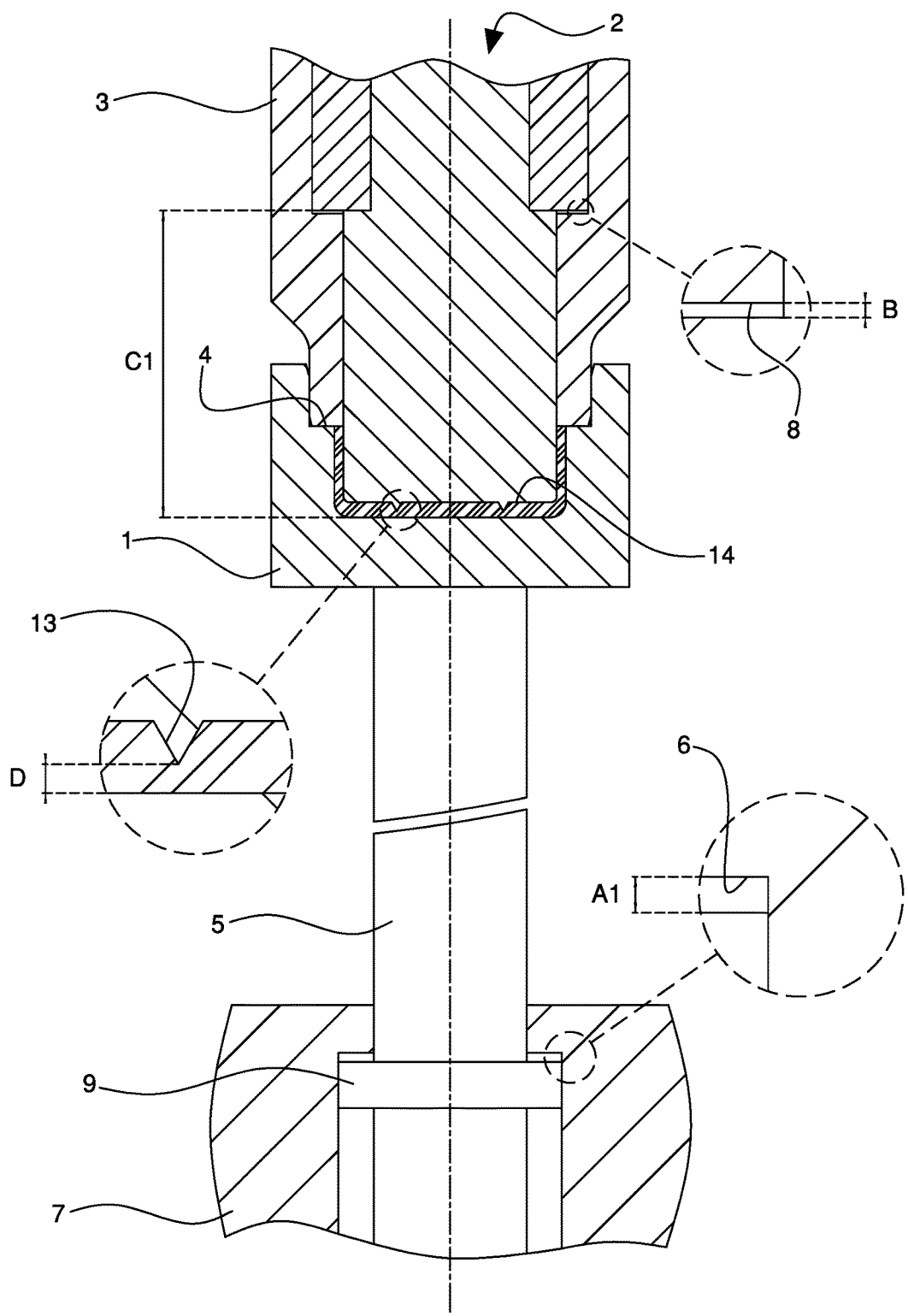
FIG. 7 is a vertical elevation cross-section of a third example of a mold according to an embodiment of the invention in a closed configuration with a plastic dose.
Figure 8:
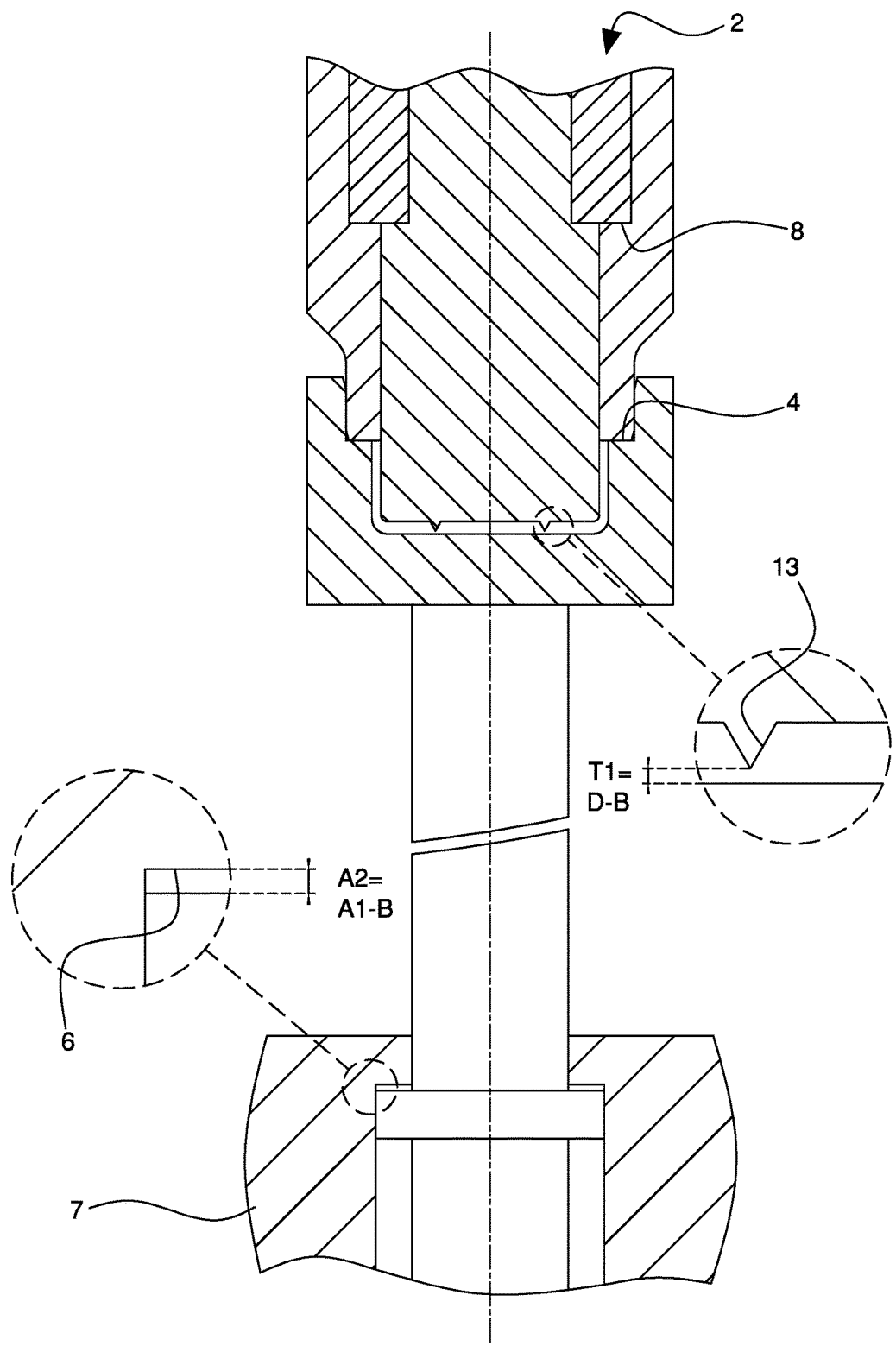
FIG. 8 shows the mold of FIG. 7 in a closed configuration without a plastic dose.
Figure 11:
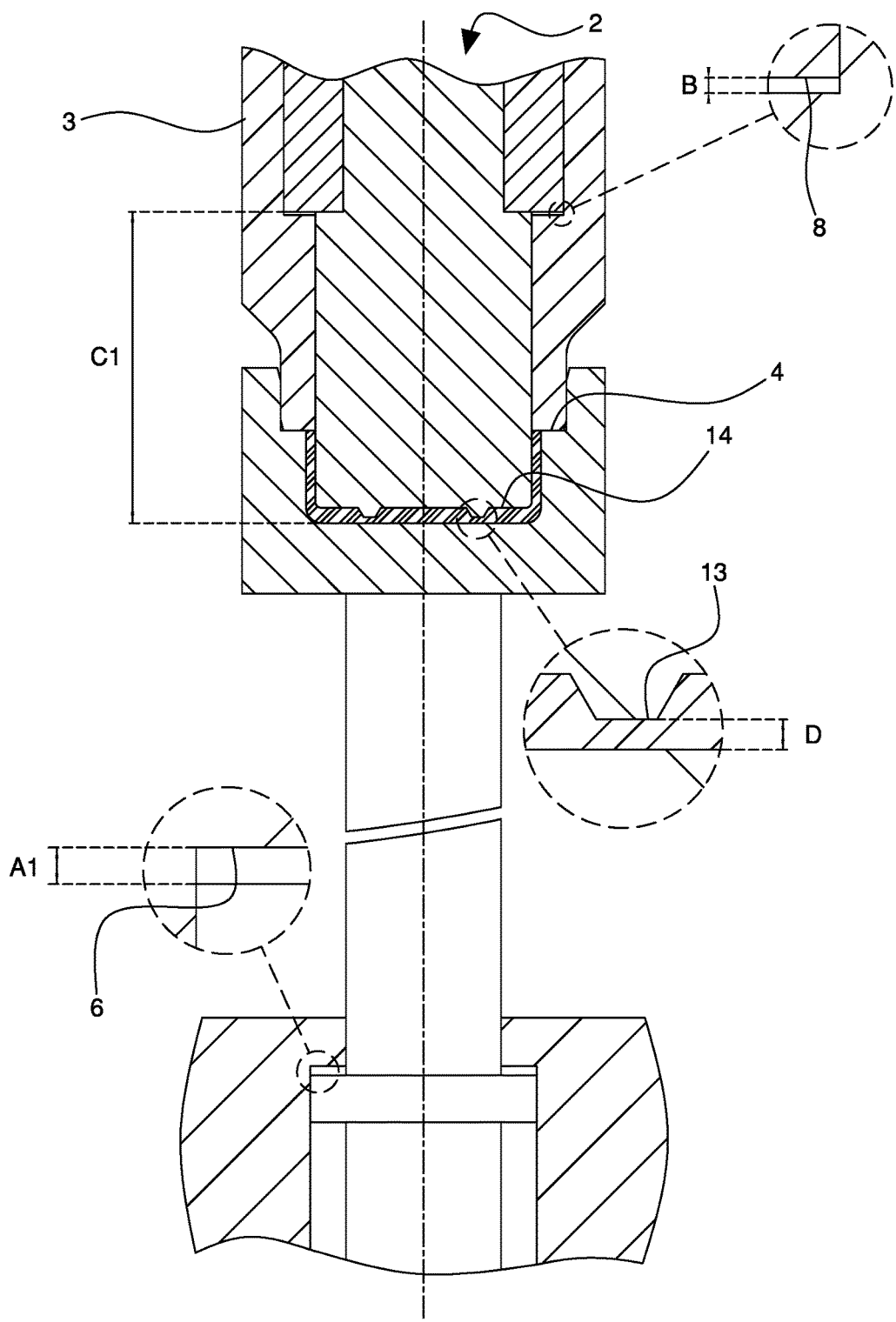
FIG. 11 is a vertical elevation cross-section of a fifth example of a mold according to an embodiment the invention in a closed configuration with a plastic dose.
Figure 12:
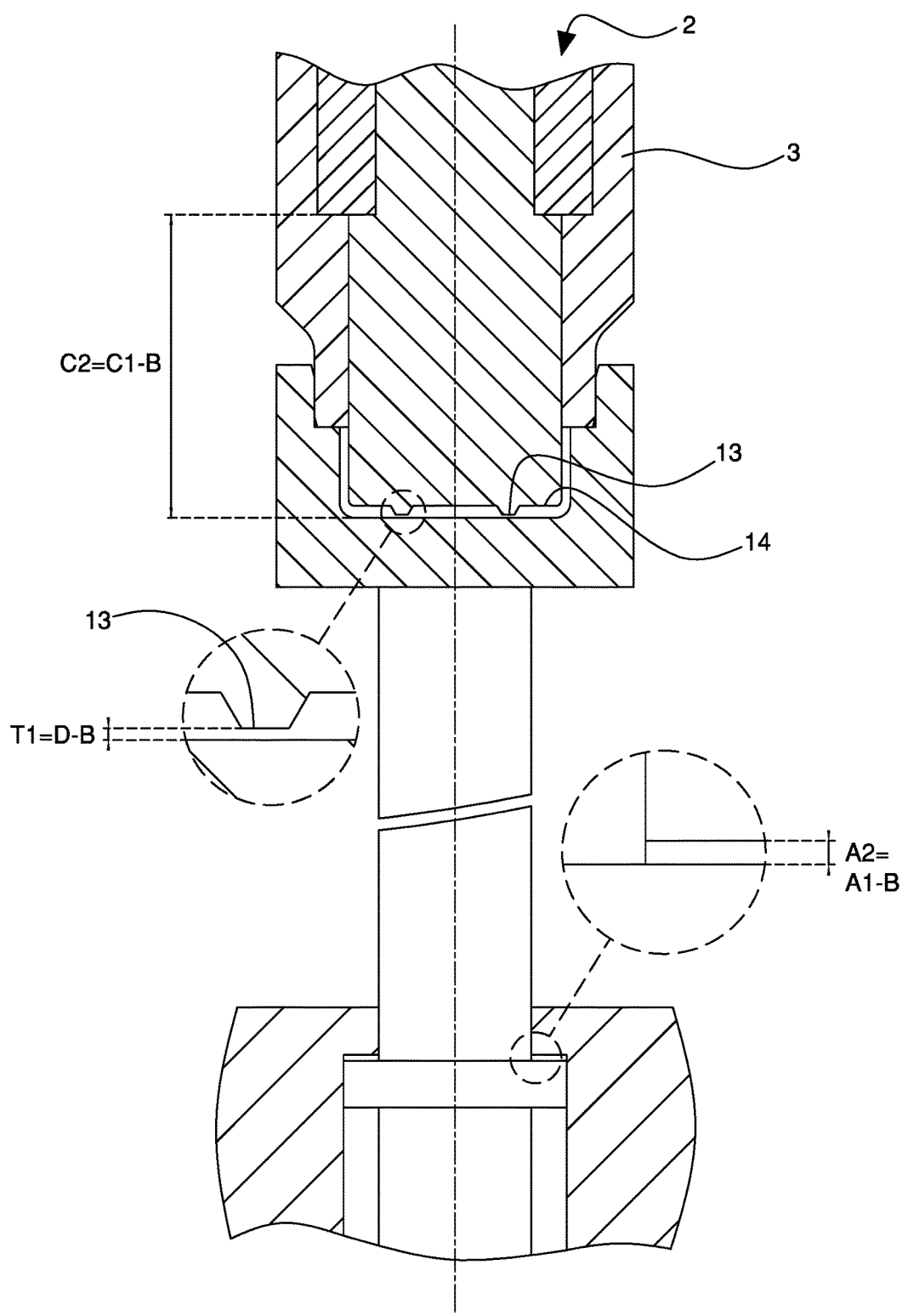
FIG. 12 shows the mold of FIG. 11 in a closed configuration without a plastic dose.
Figure 13:
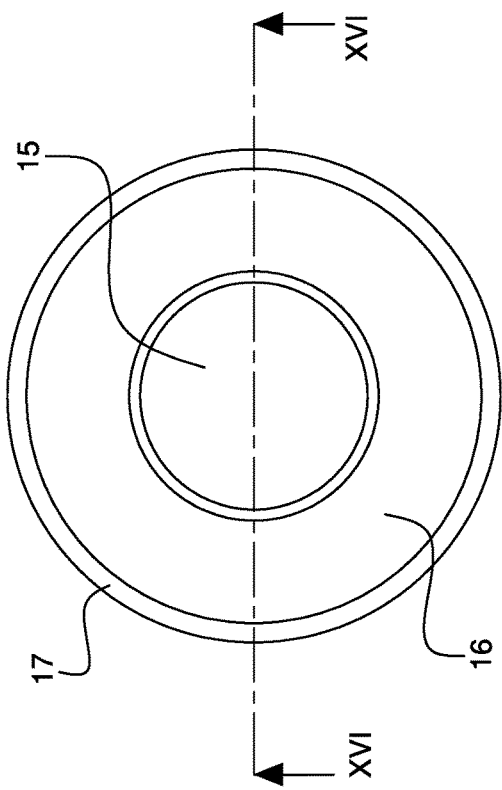
FIG. 13 is a top view of a body obtainable with a mold realized according to an embodiment of the invention.
Figure 14:
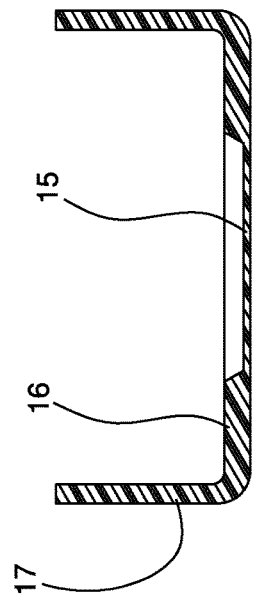
FIG. 14 is the XIV-XIV cross-section of FIG. 13.
Figure 15:
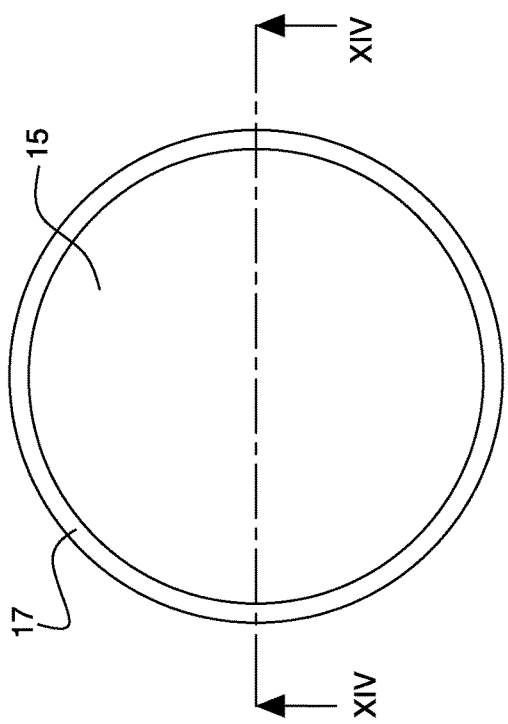
FIG. 15 is a top view of another body obtainable with a mold realized according to an embodiment of the invention.
Figure 16:
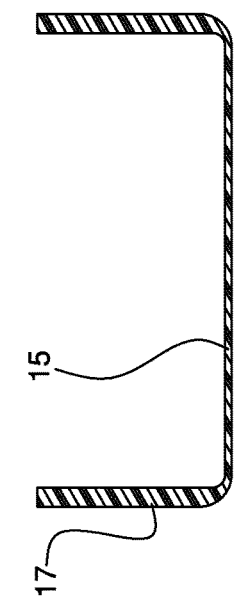
FIG. 16 is the XVI-XVI cross-section of FIG. 15.
Figure 17:
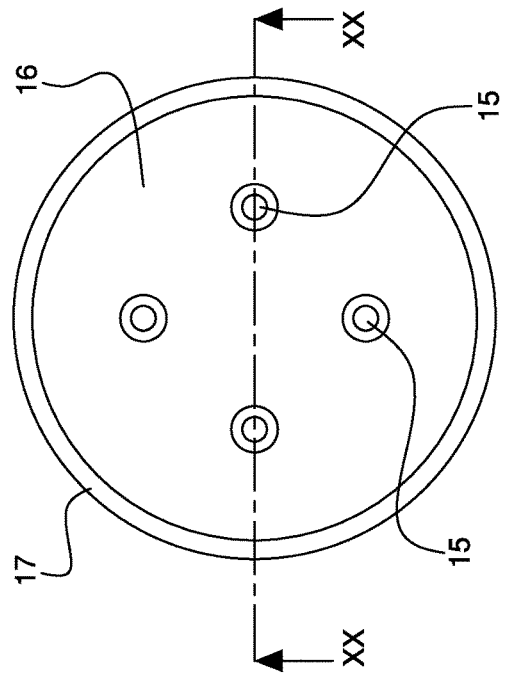
FIG. 17 is a top view of yet another body obtainable with a mold realized according to an embodiment of the invention.
Figure 18:
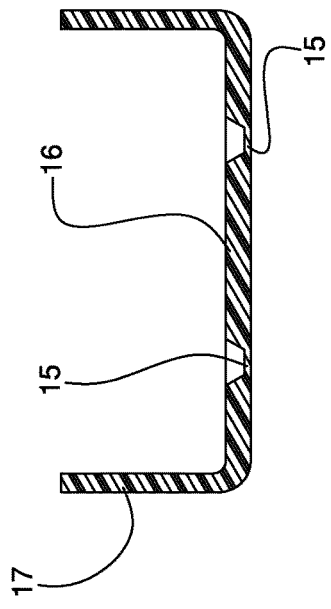
FIG. 18 is the XVIII-XVIII cross-section of FIG. 17.
Figure 19:
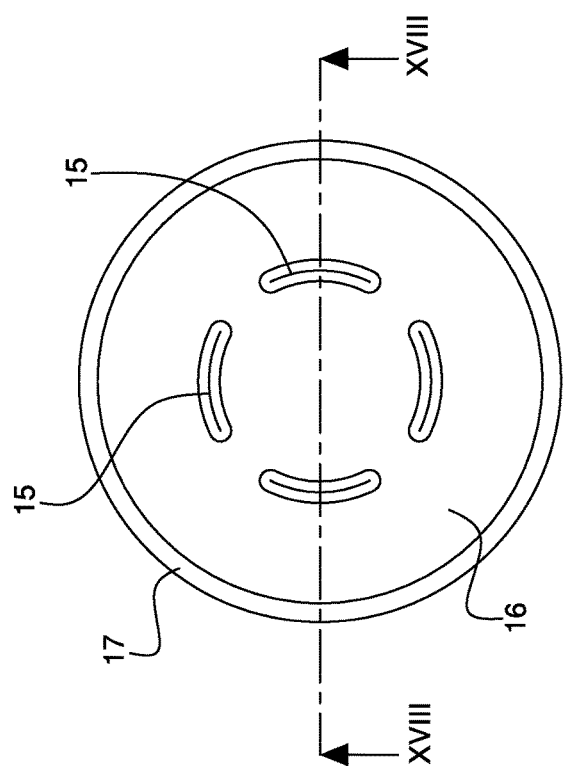
FIG. 19 is a top view of a further body obtainable with a mold realized according to an embodiment of the invention.
Figure 20:
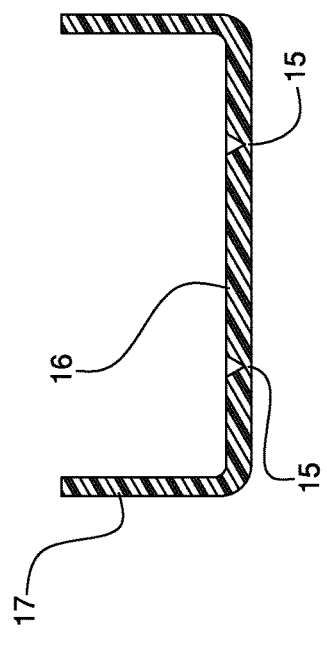
FIG. 20 is the XX-XX cross-section of FIG. 19.

The area 13 may be shaped as a continuous or dashed line to form thin wall portions linearly extended or the area 13 may form one or more spots spaced from each other. This area 13 may be arranged, for example, along a circumference having the center on the X axis. The area 13 may have a triangle-shaped cross-section as shown in FIGS. 7 and 8 or a trapezoid-shaped cross-section as shown in FIGS. 11 and 12.

The above-described compensation assembly may also be associated with implementation examples like the ones illustrated in the embodiments of FIGS. 7 to 12.

Moreover, a compression molding apparatus for plastic material doses is described but not illustrated. This forming apparatus includes at least one revolving carousel supporting at least one mold arranged in order to receive plastic material doses separated by an extruder, particularly a plurality of molds angularly arranged apart from each other, wherein each mold is realized according to the embodiments of the present invention. This forming apparatus may include at least one extruder (of a known type) and an assembly of a known type for separating the plastic material doses from the extruder. The separating assembly may include at least one revolving carousel carrying at least one separating member. The apparatus may also include apparatus of a known type for transferring the separated dose from the extruder to the mold.

During usage, at least one dose of melted plastic material is separated from one outlet of the extruder and it is transferred inside the mold in the mold open position. Then, the mold is closed, for example by raising the lower first half-mold 1 which will approach the upper second half-mold 2 until reaching the non-end closed position shown FIG. 3 or 5 or 7 or 9 or 11. In this position, the thickness of the bottom wall of the object or cap will be equal to D. This thickness will generally be greater than the dimension T1 of the cavity with the empty closed mold without a dose, thereby the second end of the tubular element 3 should not abut against the end stop 8 being placed on the second half-mold 2. Generally, it will be possible to mold objects having a bottom wall thickness greater than T1, without the risk of hard contact between the first surface of the first half-mold 1 and the second surface of the second half-mold 2 apart from dimensional tolerances also accounting for construction errors and any elastic and/or thermal deformation of the mold elements. Any elastic and/or thermal deformation of elements of the thermoforming apparatus that are external to the mold will not affect the dimensional precision of the mold end closed position.

FIGS. 13 to 20 illustrate molded bodies or elements realizable using the molds of FIGS. 3 to 12. In the illustrated examples, the lateral tubular wall of the molded product is vertical. It is possible to consider other examples where the molded product has an outwardly tapered lateral wall or another shape.

Referring to the FIGS. 21 to 30, there are shown other body or element examples realizable using molds according to the embodiments of the invention.

Figure 21:
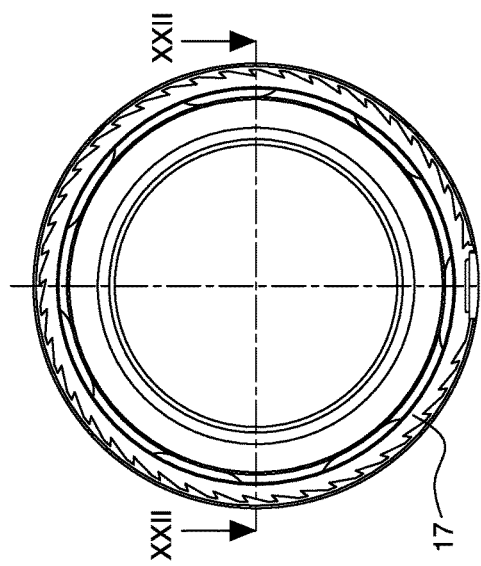
FIG. 21 is a top view of a container closure cap obtainable with a mold realized according to an embodiment of the invention.
Figure 22:
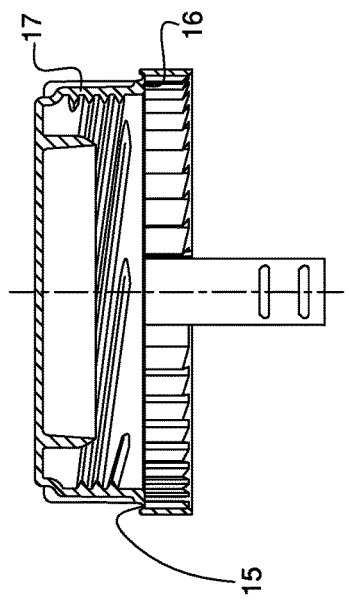
FIG. 22 is the XXII-XXII cross-section of FIG. 21.
Figure 27:
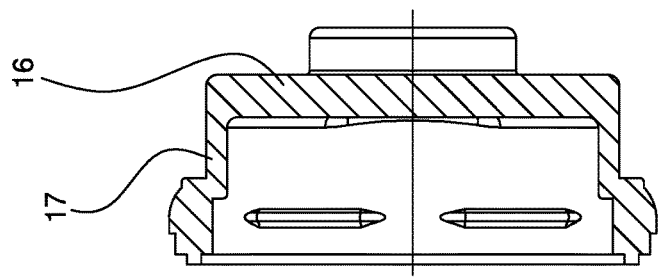
FIG. 27 is the XXVII-XXVII cross-section of FIG. 25.
Figure 29:
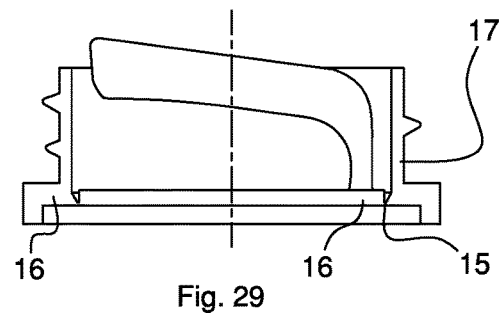
FIG. 29 is the XXIX-XXIX cross-section of FIG. 28.
Figure 28:
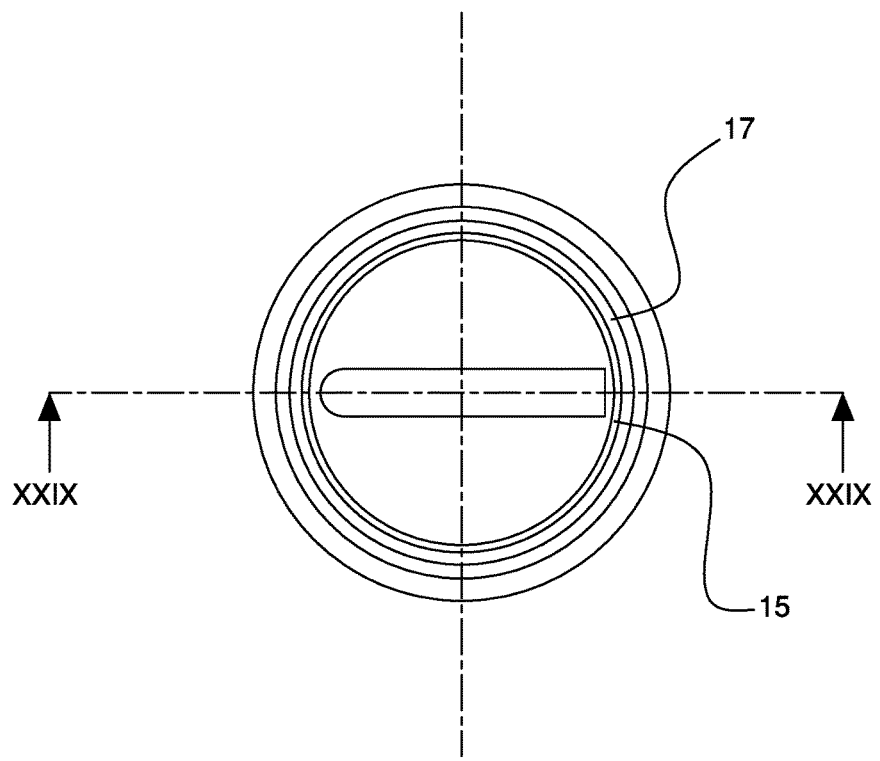
FIG. 28 is a top view of a container-closing element obtainable with a mold realized according to an embodiment of the invention.
Figure 30:
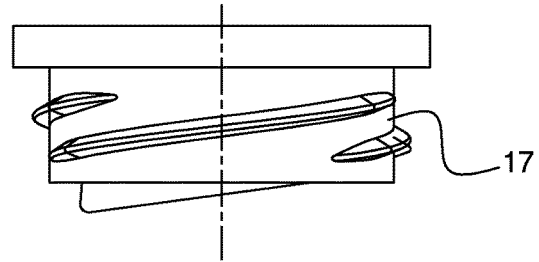
FIG. 30 is a lateral view from top of FIG. 28.

As set forth above, the molded products may be particularly useful to form several types of plastic elements such as, for example, containers closing caps having a weakened line (for example in order to remove a safety lock device, like in the example of FIGS. 21 and 22), container elements having a pierceable portion, for example for drip-feeds or the like, as in the examples of FIGS. 23 to 27, container closures having a removable portion for example, closures being associable with a container body as shown in FIGS. 28 to 30, other cap types having a weak portion particularly having an opening portion that is breakable, pierceable, tearable, etc.

Each molded element includes a rigid body. In particular, each molded element may be realized as a single piece by compression molding a plastic material. The plastic material of the molded product may include, for example, at least one material selected from: polyolefins, polyesters, polyamides, polysaccharides, among which for example HDPE, PP, LDPE, PET, PLA, PBT, PEF, nylon, cellulose, and combinations or mixtures of the above-mentioned materials.

Each body may have a bottom wall which may includeat least one weak portion 15 or a portion being breakable, openable, pierceabie, etc. having a smaller thickness obtained in the mold at the areas 13 and at least one bearing portion 16 having a greater thickness obtained in the mold at the areas 14 The weak portion 15 may include a membrane portion, for example a continuous membrane free of through-holes or other through discontinuities interrupting the membrane wall.

The weak portion 15 may be at least partially breakable by a pull force, for example being exerted by an operator manually pulling a tongue or other grip element in order to tear the weak portion 15, or by a push force, for example a pressure being exerted by a push element for example, a piercing solid body, such as a spout or a syringe, or a fluid under pressure, which pushes to break the weak portion 15. The illustrated embodiments differ from each other in the different shape and arrangement of the weak portions 15, namely of the body areas which are intended to fracture.

The bearing portion 16, for example, may have a maximum thickness that is more than double, or more than triple, or more than quadruple, or more than quintuple, with respect to a minimum thickness of the weak portion 15.

Particularly, the weak portion 15 may have at least one thickness less than 0.4 millimeters, or less than 0.3 millimeters, or less than 0.2 millimeters, for example between 0.005 and 0.3 millimeters, or between 0.01 and 0.2 millimeters, or between 0.02 and 0.1 millimeters, or equal to 0.020±0.015 millimeters.

As in these examples, the body may have a lateral wall 17 extending from a peripheral edge of the bottom wall. As in these examples, the body may have one upper opening which could be intended to be closed or sealed defined by an edge of the lateral wall 17.

In the examples illustrated from FIG. 13 to FIG. 20, the lateral wall 17 of each body has a cylinder shape. However, it is possible to envision that the cap body may have a lateral wall having a different shape, for example a tapered or conical shape having an upper opening diameter greater than the bottom wall diameter or having a shape outwardly rounded in the middle, or having a shape inwardly receding in the middle or having yet another shape.

The molded product shown in FIGS. 21 and 22 is a single piece body that forms a container cap wherein the weak portion 15 includes a facilitated fracture line defining a safety ring being removable by tearing.

Figure 24:
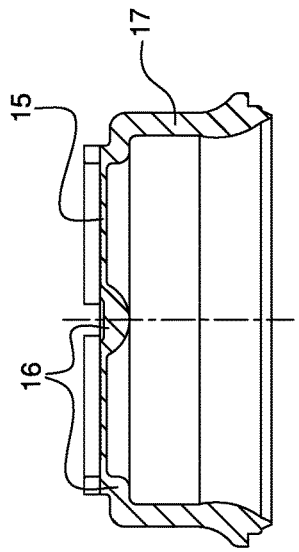
FIG. 24 is the XXIV-XXIV cross-section of FIG. 23.
Figure 23:
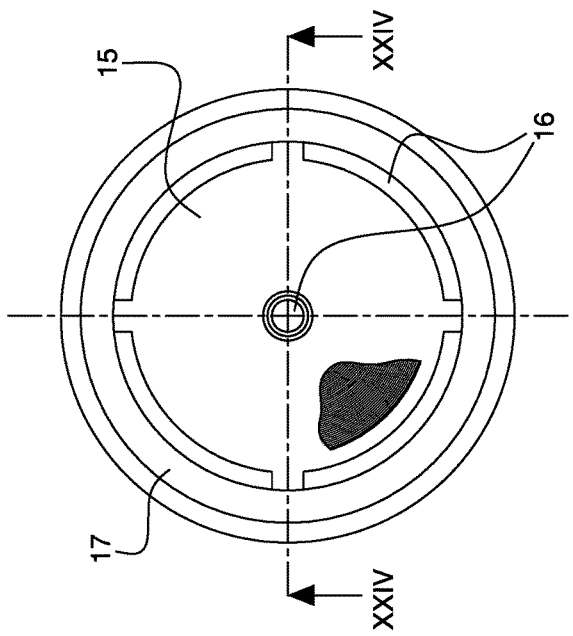
FIG. 23 is a top view of a drip-feed element obtainable with a mold realized according to an embodiment of the invention.

The molded product shown in FIGS. 23 and 24 is a single piece body that forms a closing element for a drip-feed wherein the weak portion 15 includes a disc-shaped annular wall defining a pierceable membrane, for example by a drip-feed cannula or syringe.

Figure 25:
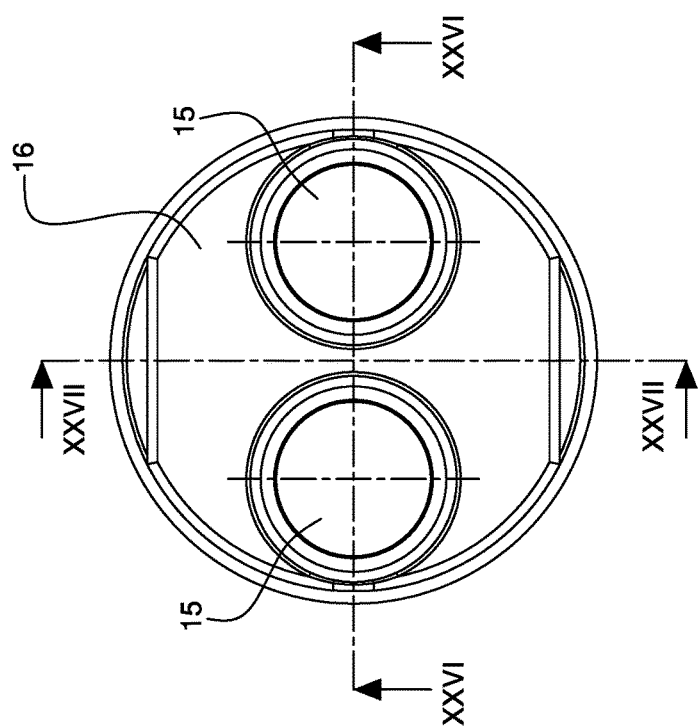
FIG. 25 is a top view of another drip-feed element obtainable with a mold realized according to an embodiment of the invention.
Figure 26:
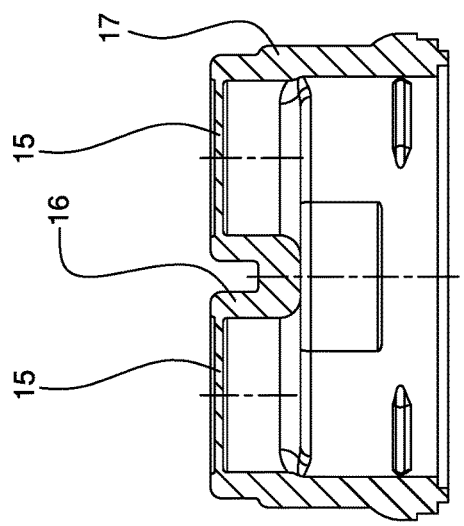
FIG. 26 is the XXVI-XXVI cross-section of FIG. 25.

The molded product shown in FIGS. 25 to 27 is a single piece body that forms another closing element for a drip-feed wherein the weak portion 15 includes a pair of disc-shaped walls defining two pierceable membranes, for example by a drip-feed cannula or syringe.

The molded product shown in FIGS. 28 to 30 is a single piece body that forms a closing element for a container wherein the weak portion 15 includes a facilitated fracture line defining a closing wall removable by tearing to allow pouring the contents outside the container.

Each above-described molded body may be manufactured by a mold realized according to embodiments of the present invention, for example one of the above-described molds, having a forming cavity of the proper shape.

The body is entirely obtained by compression molding a plastic material without any additional machining for material deformation or removal, for example incisions or cuttings for the purpose of forming the weak areas intended to fracture. Hence, the operable areas, namely the weak portions 15 in the continuous membranes are directly obtained in the compression molding phase. The weakened areas do not have discontinuities in the material flow lines as would occur with mechanical machining following the molding and therefore the material mechanical characteristics are less sensitive to thermal and/or aging phenomena.

Moreover, it has been observed that the operable areas being formed by the weak portions 15 have such characteristics to avoid or reduce the risk of developing small splinters of plastic material when fracturing the portions 15 themselves.

The invention claimed is:

1. A mold for compression molding doses of plastics comprising:
   first and second half molds that are axially movable with respect to one another between an open position for inserting at least one dose of plastics between said half molds, a non-end closed position in which at least one dose of plastics is pressed in a cavity bounded at least partially by said first and second half molds, and an end closed position in which said cavity has a volume that is less than in said non-end closed position in the absence of a dose of plastics;
   a tubular element arranged around said second half mold and axially slidable with respect thereto, wherein when said first and second half molds are in said non-end closed position, said tubular element at least partially bounds said cavity and is arranged in contact with an axial abutment arranged on said first half mold and when said first and second half molds are in said end closed position, said tubular element is arranged on one side in contact with said axial abutment and on the other side in contact with an axial end stop arranged on said second half mold.

2. A mold according to claim 1, wherein, when said first and second half molds are in said end closed position, said cavity is bounded by a first surface of said first half mold and by a second surface of said second half mold, said first and second surfaces being transverse to an axis of said first and second half molds, facing one another and being spaced apart from one another at a minimum distance less than 0.4 millimetres.

3. A mold according to claim 2, wherein at least one of said first and second surfaces has one or more zones arranged at said minimum distance and is configured to form wall portions of lesser thickness and adjacent zones configured for forming wall portions of greater thickness.

4. A mold according to claim 1, wherein said first half mold is carried by a movable actuator which, when said first and second half molds are in said end closed position, is spaced away from any actuator axial end stop to prevent said half molds from abutting during a mold-closing step.

5. A mold according to claim 1, wherein, when said first and second half molds are in said end closed position, said tubular element partially bounds said cavity.

6. A mold according to claim 1, and further comprising a compensating assembly that at least partially bounds said cavity when said first and second half molds are in said end closed position and in said non-end closed position, said compensating assembly being axially movable to vary a volume of said cavity.

7. A mold according to claim 6, wherein said compensating assembly is arranged between said tubular element and said second half mold.

8. A mold according to claim 6, wherein said compensating assembly comprises a tubular body that is slidably coupled with at least one of said second half mold and said tubular element.

9. A mold according to claim 8, wherein said compensating assembly comprises an elastic element for pushing said tubular body against an abutment on said tubular element.

\* \* \* \* \*